United States Patent
Lin et al.

(10) Patent No.: US 11,431,252 B2
(45) Date of Patent: Aug. 30, 2022

(54) FLYBACK CONVERTER AND CONTROL METHOD THEREOF

(71) Applicant: ALPHA AND OMEGA SEMICONDUCTOR INTERNATIONAL LP, Sunnyvale, CA (US)

(72) Inventors: Guan-Yu Lin, Taipei (TW); Yu-Ming Chen, Hsinchu (TW); Jung-Pei Cheng, Zhubei (TW); Tien-Chi Lin, New Taipei (TW); Hsiang-Chung Chang, Zhubei (TW); Yueh-Ping Yu, Zhubei (TW)

(73) Assignee: ALPHA AND OMEGA SEMICONDUCTOR INTERNATIONAL LP, Toronto (CA)

( * ) Notice: Subject to any disclaimer, the term of this patent is extended or adjusted under 35 U.S.C. 154(b) by 85 days.

(21) Appl. No.: 16/881,119

(22) Filed: May 22, 2020

(65) Prior Publication Data

US 2021/0367523 A1    Nov. 25, 2021

(51) Int. Cl.
*H02M 3/335* (2006.01)
*H02M 1/08* (2006.01)
*H02M 1/00* (2006.01)

(52) U.S. Cl.
CPC ......... *H02M 3/33576* (2013.01); *H02M 1/08* (2013.01); *H02M 3/33592* (2013.01); *H02M 1/0054* (2021.05); *H02M 3/33569* (2013.01)

(58) Field of Classification Search
CPC ........... H02M 3/33576; H02M 1/0054; H02M 3/33592
See application file for complete search history.

(56) References Cited

U.S. PATENT DOCUMENTS

| | | | |
|---|---|---|---|
| 5,991,171 A * | 11/1999 | Cheng | H02M 3/33507 363/21.03 |
| 9,118,255 B2 | 8/2015 | Lin et al. | |
| 9,899,931 B1 * | 2/2018 | Chang | H02M 3/33592 |
| 9,991,811 B1 | 6/2018 | Song et al. | |
| 10,250,152 B2 * | 4/2019 | Chang | H02M 1/32 |
| 10,270,354 B1 | 4/2019 | Lu et al. | |
| 10,461,652 B2 | 10/2019 | Tang et al. | |
| 2010/0182808 A1 * | 7/2010 | Sato | H02M 3/33592 363/21.18 |
| 2014/0043863 A1 * | 2/2014 | Telefus | H02M 3/33592 363/17 |
| 2016/0294292 A1 * | 10/2016 | Huang | H02M 1/44 |
| 2017/0063213 A1 | 3/2017 | Lin et al. | |
| 2020/0036280 A1 * | 1/2020 | Yang | H02M 1/083 |
| 2021/0111634 A1 * | 4/2021 | Chang | H03M 1/1245 |
| 2021/0194378 A1 * | 6/2021 | Tian | H02M 3/33592 |
| 2021/0249964 A1 * | 8/2021 | Kong | H02M 1/0058 |

* cited by examiner

*Primary Examiner* — Kyle J Moody
(74) *Attorney, Agent, or Firm* — Chen-Chi Lin

(57) ABSTRACT

A flyback converter, including: a transformer, a first switch, a second switch, and a control circuit. The transformer includes a first side and a second side. The first switch is coupled to the first side at an input terminal. The second switch is coupled to the second side and an output terminal. The control circuit is coupled between the output terminal and the second switch, wherein the control circuit is arranged to adjust a voltage on the input terminal by changing a flow of a current between the second switch and the second side.

17 Claims, 7 Drawing Sheets

120

FLYBACK CONVERTER AND CONTROL METHOD THEREOF

FIELD OF THE INVENTION

The present disclosure relates to an electronic device, and more particularly, to a flyback converter and a control method thereof.

BACKGROUND OF THE INVENTION

Nowadays, the power supplies can be divided into two categories: the linear power supplies and the switching power supplies. Currently, the various switching power supplies, e.g., flyback converter, are the main streams of the market. However, the switching loss of the switch adopted in the switching power supply is an obstacle for improving the system efficiency.

SUMMARY OF THE INVENTION

One of the objectives of the present disclosure is to provide a flyback converter and associated control method to solve the switching loss issues.

In examples of the present disclosure, a flyback converter comprises a transformer, a first switch, a second switch, and a control circuit. The transformer includes a first side and a second side. The first switch is coupled to the first side at an input terminal. The second switch is coupled to the second side and an output terminal. The control circuit is coupled between the output terminal and the second switch, wherein the control circuit is arranged to adjust a voltage on the input terminal by changing a flow of a current between the second switch and the second side.

In examples of the present disclosure, a flyback converter comprise: a transformer, a first switch, a second switch, a first control circuit and a second control circuit. The transformer includes a first side and a second side. The first switch and the first side are connected in series between an input voltage and a ground terminal. The second switch and the second side are connected in series between an output terminal and the ground terminal. The first control circuit is coupled to the second switch, and the first control circuit is arranged to compare an output voltage on the output terminal to a reference voltage, and activate the second switch at a first time point when the output voltage is smaller than the reference voltage. The first control circuit is further arranged to deactivate the second switch at a second time point. The second control circuit is coupled to the first switch, wherein the second control circuit is arranged to activate the first switch at a third time point after the second switch is deactivated.

In examples of the present disclosure, a control method of a flyback converter is disclosed. The flyback converter includes a transformer, a first switch coupled to a first side of the transformer, and a second switch coupled to a second side of the transformer. The control method comprises: activating the second switch at a first time point to induce an output current; deactivating the second switch at a second time point, at which the output current decreases to zero; activating the second switch at a third time point to induce the output current, wherein a flow of the output current at the third time point is opposite to a flow of the output current at the second time point; deactivating the second switch at a fourth time point to induce an input current from the input terminal to an input voltage; and activating the first switch at a fifth time point, at which a voltage on the input terminal decreases to zero.

DETAILED DESCRIPTION OF THE INVENTION

Figure 1:
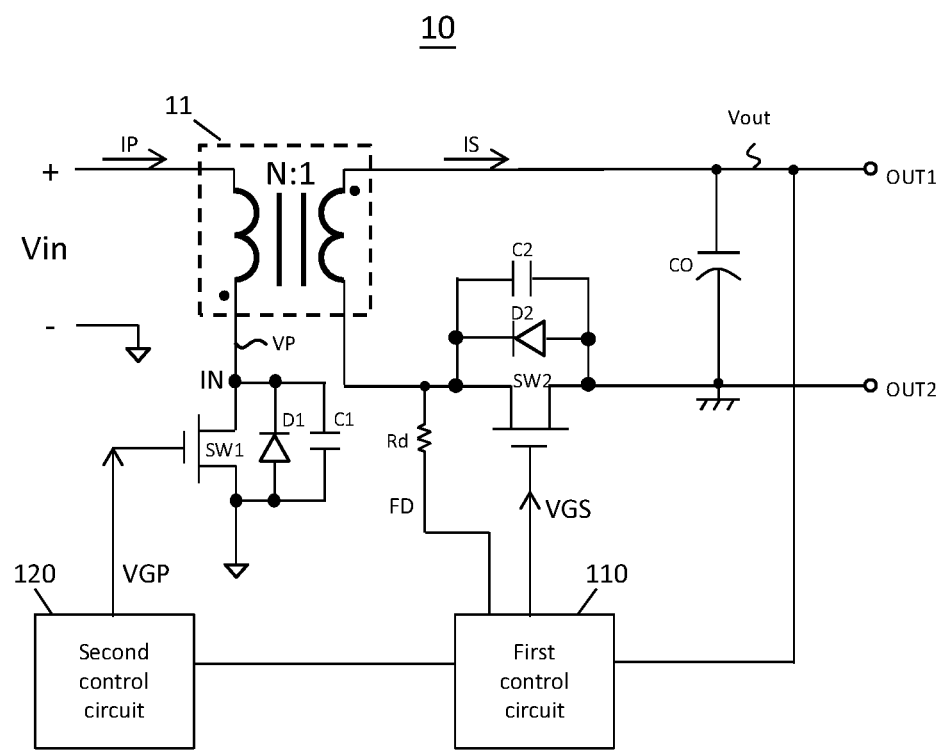
FIG. 1 is a diagram illustrating a flyback converter in examples of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain tolerances necessarily resulting from the standard deviation found in the respective testing measurements.

FIG. 1 is a diagram illustrating a flyback converter 10 in examples of the present disclosure. The flyback converter 10 includes a transformer 11, a first switch SW1, a second switch SW2, a first diode D1, a second diode D2, a first capacitor C1, a second capacitor C2, a first control circuit 110, and a second control circuit 120.

The transformer 11 includes a first side and a second side. In this embodiment, the first side is the primary side of the transformer 11, and the second side is the secondary side of the transformer 11. In this embodiment, the turn ratio of the primary side and the secondary side is N, wherein N is a natural number. The first side and the first switch SW1 are connected in series between an input voltage Vin and a ground terminal. The first diode D1, the first capacitor C1 and the first switch SW1 are connected in parallel. In this embodiment, the first switch SW1 is implemented by a Metal-Oxide-Semiconductor Field Effect Transistor (MOSFET). A drain terminal of the first switch SW1, a cathode of the first diode D1 and one terminal of the first capacitor C1 are connected to the first side of the transformer 11 at an input terminal IN. A source terminal of the first switch SW1, an anode of the first diode D1, the other terminal of the first capacitor C1 are connected to the ground terminal.

It should be noted that, in other embodiments, the first switch SW1 can be implemented by a bipolar junction transistor (BJT) or other devices with the similar functions. Moreover, the first diode D1 and the first capacitor C1 can be the elements added by the designer or the parasitic elements formed in the first switch SW1. In addition, the location of the first switch SW1 is not limited to couple between the first side and the ground terminal. In other embodiments, the first switch SW1 is coupled between the input voltage Vin and the first side.

The second side and the second switch SW2 are connected in series between output terminals OUT1 and OUT2 of the flyback converter 10. The second diode D2, the second capacitor C2 and the second switch SW2 are connected in parallel. In this embodiment, the second switch SW2 is implemented by a MOSFET. A drain terminal of the second switch SW2, a cathode of the second diode D2 and one terminal of the second capacitor C2 are connected to the second side of the transformer 11. A source terminal of the second switch SW2, an anode of the second diode D2, the other terminal of the second capacitor C2 are connected to the output terminal OUT2.

It should be noted that, in other embodiments, the second switch SW2 can be implemented by a BJT or other devices with the similar functions. Moreover, the second diode D2 and the second capacitor C2 can be the elements added by the designer or the parasitic elements formed in the second switch SW2. In addition, the location of the second switch SW2 is not limited to couple between the second side and the output terminal OUT2. In other embodiments, the second switch SW2 is coupled between the second side and the output terminal OUT1.

The first control circuit 110 is coupled between the output terminal OUT1 and the second switch SW2. The first control circuit 110 is arranged to activate/deactivate the second switch SW2 by an activating signal VGS according to an output voltage Vout and an output current IS. When the second switch SW2 is activated, the energy is provided to an output load coupled between the output terminals OUT1 and OUT2 from the second side of the transformer 11. The second control circuit 120 is coupled between the first control circuit 110 and the first switch SW1. The second control circuit 120 is arranged to activate/deactivate the first switch SW1 by an activating signal VGP. When the first switch SW1 is activated, the energy is provided to the first side of the transformer 11 from the input voltage Vin.

Figure 2:
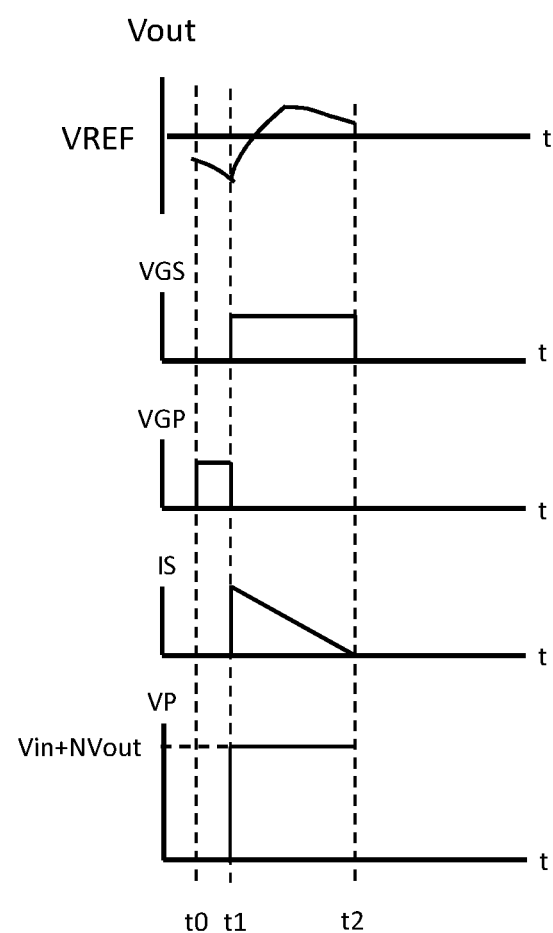
FIG. 2 is a timing diagram illustrating a first part of the operation of the flyback converter in examples of the present disclosure.

For the flyback converter 10, the on-time of the first switch SW1 and the second switch SW2 are staggered. That is, when the first switch SW1 is activated, the second switch SW2 is deactivated, vice versa. Refer to FIG. 2 in conjunction with FIG. 1, wherein FIG. 2 is a timing diagram illustrating a first part of the operation of the flyback converter 10 in examples of the present disclosure. As shown in FIG. 2, at a time point t0, the activating signal VGP goes high and instructs the first switch SW1 to turn on. Responding to the activation of the first switch SW1, an input current IP is provided on the first side of the transformer 11. Specifically, the input current IP flows from the input voltage Vin to the first side of the transformer 11, which is stored as the electrical energy.

At a time point t1, the activating signal VGP goes low and instructs the first switch SW1 to turn off. In the meantime, the activating signal VGS goes high and instructs the second switch SW2 to turn on. Responding to the deactivation of the first switch SW1 and the activation of the second switch SW2, the output current IS is inducted on the second side of the transformer 11. Specifically, the output current IS flows from the second side of the transformer 11 to the output load. In addition, a voltage VP on the input terminal IN is pulled up to Vin+NVout at the time point t1. From the time point t1, the output current IS keeps providing energy to the output load, which makes the magnitude of the output currents gradually decrease. On the other hand, the output voltage Vout gradually increases to a peak value and decreases.

At a time point t2, the magnitude of the output current IS decreases to zero. Accordingly, the activating signal VGS goes low and instructs the second switch SW2 to turn off. So far, the first part of the operation of the first control circuit 110 and the second control circuit 120 in a switching cycle finishes.

Referring back to FIG. 1, the flyback converter 10 further includes an output capacitor CO and a detection resistor Rd, wherein the output capacitor CO is coupled between the output terminals OUT1 and OUT2, and the detection resistor Rd is coupled between the second side of the transformer 11 and the first control circuit 110. The output capacitor CO stores the energy provided by the output current IS. The detection resistor Rd provides a feedback information FD to the first control circuit 110. In some embodiments, the feedback information FD is the voltage drop across the detection resistor Rd. In some embodiments, the feedback information FD reflects the magnitude of the output current IS. For example, when the output current IS decreases to zero at the time point t2, the feedback information FD informs the first control circuit 110, and the first control circuit 110 deactivates the second switch at the time point t2 accordingly.

In this embodiment, the first control circuit 110 is further arranged to adjust the voltage VP on the input terminal IN by changing the flow of the output current IS between the second switch SW2 and the second side of the transformer 11. By this, the switch loss of the first switch SW1 can be reduced, and the efficiency can be increased. The details of the first control circuit 110 and the second control circuit 120 will be described in the following paragraphs.

Figure 3:
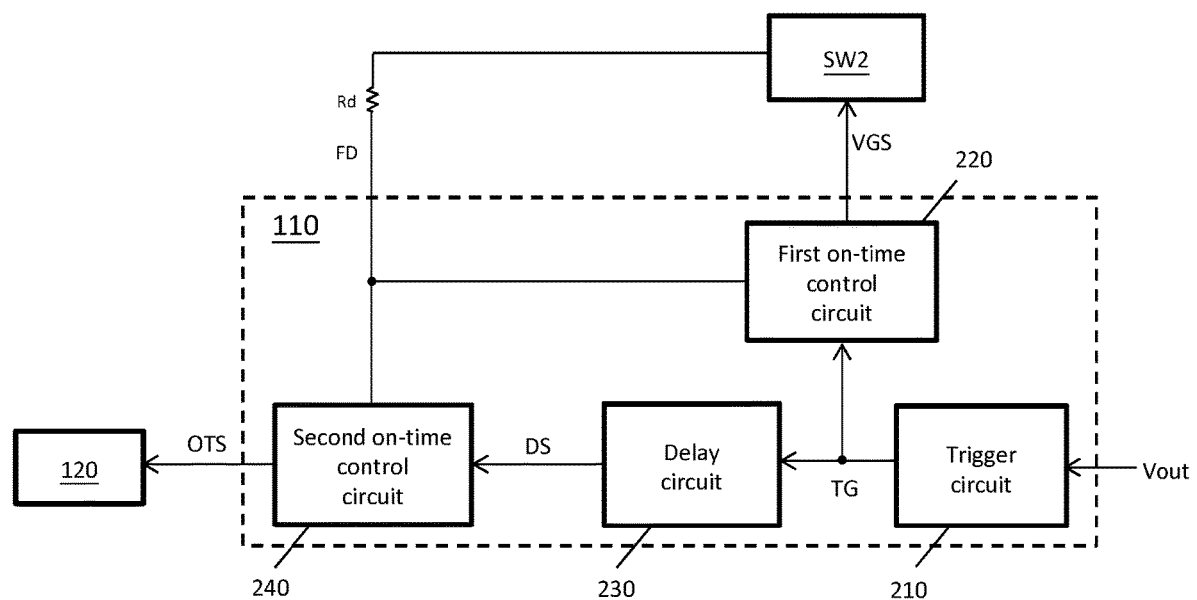
FIG. 3 is a diagram illustrating a first control circuit in examples of the present disclosure.
Figure 4:
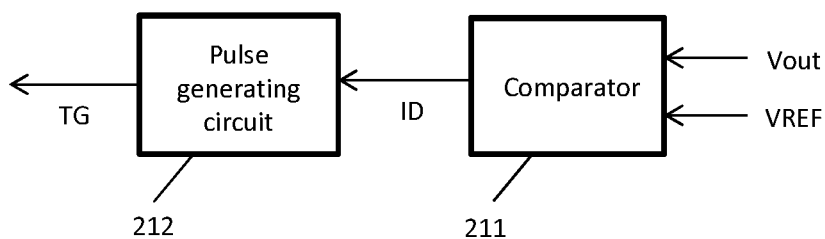
FIG. 4 is a diagram illustrating a trigger circuit in examples the present disclosure.

FIG. 3 is a diagram illustrating the first control circuit 110 in examples of the present disclosure. The first control circuit 110 includes a trigger circuit 210. The trigger circuit 210 is arranged to generate a trigger signal TG by comparing the output voltage Vout to a reference voltage VREF. Specifically, refer to FIG. 4, which is a diagram illustrating the trigger circuit 210 in examples of the present disclosure. The trigger circuit 210 includes a comparator 211 and a pulse generating circuit 212. The comparator 211 generates an indication signal ID by comparing the output voltage Vout to the reference voltage VREF. The pulse generating circuit 212 generates a pulse signal as the trigger signal TG when the indication signal ID indicates that the output voltage Vout is smaller than the reference voltage VREF.

Referring back to FIG. 3 again, the first control circuit 110 further includes a first on-time control circuit 220. The first on-time control circuit 220 is arranged to activate/deactivate the second switch SW2 by the activating signal VGS. In this embodiment, the first on-time control circuit 220 includes, but not limited to, a SR control circuit to control the activation/deactivation of the second switch SW2. For example, at the time point t2, the SR control circuit deactivates the second switch SW2 when the feedback information FD indicates that the output current IS decreases to zero.

In addition, the first on-time control circuit 220 further activates the second switch SW2 by the activating signal VGS when the trigger signal TG indicates that the output voltage Vout is smaller than the reference voltage VREF, and deactivates the second switch SW2 by the activating signal VGS when the second switch SW2 is activated for a predetermined period.

Figure 5:
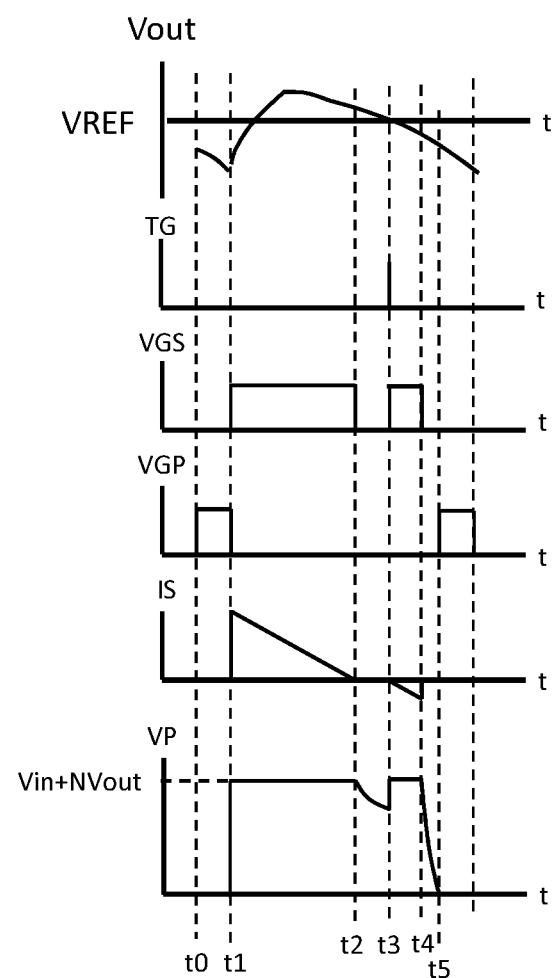
FIG. 5 is a timing diagram illustrating a second part of the operation of the flyback converter in examples of the present disclosure.

Refer to FIG. 5 in conjunction with FIG. 1, wherein FIG. 5 is a timing diagram illustrating a second part of the operation of the flyback converter 10 in examples of the present disclosure. As mentioned above, the output current IS decreases to zero at the time point t2 and stops providing energy. However, the output capacitor CO will provide energy to the output load since then, which makes the output voltage Vout decrease after the time point t2. In addition, because the first switch SW1 and the second switch SW2 are both deactivated at the time point t2, the voltage VP on the input terminal IN starts resonating. That is, the voltage VP can increase or decrease from the time point t2 to the time point t3. The profile of the voltage VP from the time point t2 to the time point t3 is based on the output load.

At a time point t3, the output voltage Vout is smaller than the reference voltage VREF. The trigger signal TG having a pulse profile is generated, and the activating signal VGS goes high accordingly. Therefore, the second switch SW2 is activated at the time point t3. Responding to the activation of the second switch SW2, the voltage VP on the input terminal IN is pulled up to Vin+NVout again.

Because the second switch SW2 is activated after the output current IS decreased to zero, the output current IS having a different flowing direction is further induced at the time point t3. Specifically, from the time point t1 to the time point t2, the flow of the output current IS is clockwise. That is, the output current IS passes by the transformer 11, the output capacitor CO, the second switch SW2, then back to the transformer 11. From the time point t3, the flow of the output current IS is counterclockwise. That is, the output current IS passes by the transformer 11, the second switch SW2, the output capacitor Co, then back to the transformer 11.

At a time point t4, the activating signal VGS goes low. Accordingly, the second switch SW2 is deactivated at the time point t4. Responding to the deactivation of the second switch SW2 at the time point t4, the magnitude of output current IS is pulled to zero again.

Because the magnitude of the output current IS is pulled to zero at the time point t4, the input current IP is inducted on the first side of the transformer 11 accordingly. Specifically, the input current IP flows from the first capacitor C1 to the input voltage Vin via the input terminal IN. Responding to the induction of the input current IP at the time point t4, the voltage VP on the input terminal IN starts to decrease. At a time point t5, the voltage VP decreases to zero. So far, the second part of the operation of the flyback converter 10 of a switching cycle finishes, and the operation of the flyback converter 10 goes back to the first part, and so on. Each switching cycle repeats from t1 to t5. The voltage regulation can thus be achieved.

By inducing the output current IS having an opposite direction from the time point t3 to the time point t4, the voltage VP on the input terminal IN can be reduced to zero by the input current IP flowing from the first capacitor C1 to the input voltage Vin via the input terminal IN. With such configurations, the switch loss of the first switch SW1 can be reduced, and the efficiency of the flyback converter 10 can be improved.

It should be noted that, to reduce the voltage VP exactly to zero, the energy provided by the input current IP from the time point t4 to the time point t5 must be accurate. The energy provided by the input current IP from the time point t4 to the time point t5 is related to the energy provided by the output current IS from the time point t3 to the time point t4. The energy provided by the output current IS is related to the magnitude of the output current IS and the period from the time point t3 to the time point t4. Specifically, a short period is required when the output current IS is strong. On the other hand, a long period is required when the output current IS is weak. That is, to provide the energy that can reduce the voltage VP to zero, the period from the time point t3 to the time point t4 is inversely-related to the changing rate of the output current IS, wherein the changing rate will be reflected by the slope of the output current IS in FIG. 5.

However, the voltage VP is not limited to decrease to zero. In other embodiments, the voltage VP decreases to a predetermined voltage from the time point t4 to the time point t5. For example, the predetermined voltage can be one-fifth of Vin+NVout. The predetermined voltage is based on the designer's consideration Referring back to FIG. 3 again, the first control circuit 110 further includes a delay circuit 230 and a second on-time control circuit 240. The delay circuit 230 is arranged to generate a delayed signal DS by delaying the trigger TG. The second on-time control circuit 240 is arranged to generate an on-time signal OTS when the delay signal DS is received, wherein the on-time signal OTS indicates an on-time of the first switch SW1 based on the feedback information FD. Specifically, the on-time of the first switch SW1 indicated by the on-time signal OTS is inversely-related to the voltage across the detection resistor Rd indicated by the feedback information FD. That is, the greater the voltage across the detection resistor Rd, the shorter the on-time of the first switch SW1.

In this embodiment, the delay signal DS is generated by delaying the trigger signal TG to the time point t5 from the time point t3. When the delay signal DS is received by the second on-time control circuit 240 at the time point t5, the on-time signal OTS is thus outputted to the second control circuit 120 to instruct the second control circuit 120 to activate the first switch SW1 at the time point t5.

Figure 6:
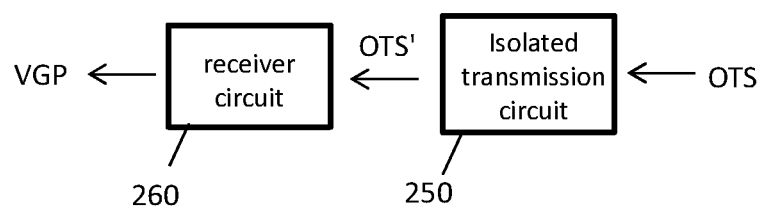
FIG. 6 is a diagram illustrating a second control circuit in examples of the present disclosure.

FIG. 6 is a diagram illustrating the second control circuit 120 in examples of the present disclosure. The second control circuit 120 includes an isolated transmission circuit 250 and a receiver circuit 260. The isolated transmission circuit 250 is arranged to generate an on-time signal OTS' by transferring the on-time signal OTS to the first side of the transformer 11 from the second side. Those skilled in the art should understand that after being transferred by the isolated transmission circuit 250, the amplitude of the on-time signal OTS' may be different from that of the on-time signal OTS. However, the information included in the on-time signal OTS is fully transferred. For example, the indication of the on-time and the off-time of the first switch SW1 is fully transferred. In this embodiment, the isolated transmission circuit 250 includes, but not limited to, a transformer, an opto-coupler, or a capacitor.

The receiver circuit 260 is arranged to receive the on-time signal OTS' from the isolated transmission circuit 250, and generate the activating signal VGP according to the on-time signal OTS' to activate/deactivate the first switch SW1. Specifically, the receiver circuit 260 is arranged to identify and decouple the information included in the on-time signal OTS' from the isolated transmission circuit 250. For example, the receiver circuit 260 identifies the on-time and the off-time of the first switch SW1 according to the rising edge and the falling edge the on-time signal OTS', respectively.

In this embodiment, the on-time signal OTS' indicates that the first switch SW1 should be activated at the time point t5 for a period as long as the period from the time point t0 to the time point t1. Therefore, the activating signal VGP instructs the first switch SW1 to turn on at the time point t5 for a period as long as the period from the time point t0 to the time point t1.

In the flyback converter 10, the trigger circuit 210 generates the trigger signal TG by comparing the output voltage Vout to the reference voltage VREF. The first on-time control circuit generate the activating signal VGS to activate the second switch SW2 when the trigger signal TG indicates that the output voltage Vout is smaller than the reference voltage VREF. However, this is not a limitation of the present disclosure. In other embodiments, the trigger signal TG can be generated based on a different mechanism.

For example, the trigger circuit 210 can include a current detecting circuit arranged to generate the indication signal ID by detecting the magnitude of the output current IS according to the feedback information FD. With such configurations, the pulse generating circuit 212 is further arranged to generate the pulse signal as the trigger signal TG when the indication signal ID indicates that the magnitude of the output current IS decreases to zero.

In some embodiments, the trigger circuit 210 generates the trigger signal TG immediately when the magnitude of the output current IS decreases to zero. For example, when the output current IS decreases to zero at the time point t2, the trigger signal TG having the pulse profile is generated at the time point t2. Therefore, at the time point t2, the activating signal VGS instructs the second switch SW2 to turn off and back on immediately.

In some embodiments, the trigger circuit 210 generates the trigger TG after the magnitude of the output current IS decreases to zero. For example, when the output current IS decreases to zero at the time point t2, the trigger signal TG is not immediately generated. For example, the trigger signal TG is generated at the time point t3. Therefore, the activating signal VGS instructs the second switch SW2 to turn off at the time point t2, and to turn on at the time point t3.

Figure 7:
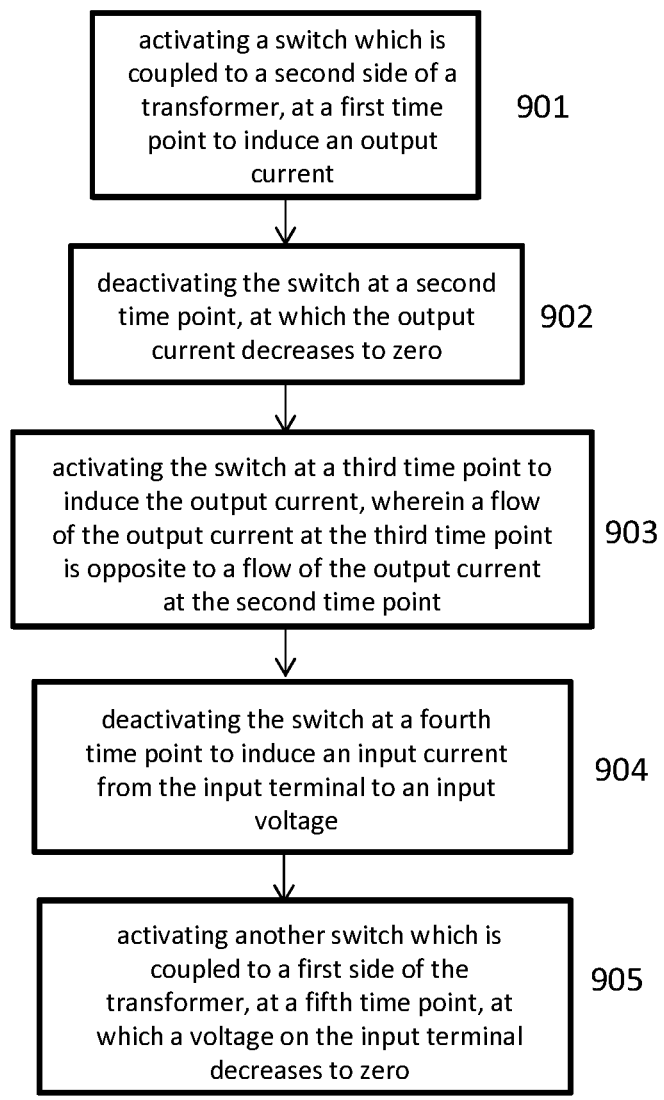
FIG. 7 is a flowchart illustrating a control method of a flyback converter in examples of the present disclosure.

FIG. 7 is a flowchart illustrating a control method 900 of a flyback converter in examples of the present disclosure. In this embodiment, the control method 900 can be applied to the flyback converter 10. For better understanding, please refer to FIG. 5 in conjunction with FIG. 7. Provided that the results are substantially the same, the operations shown in FIG. 7 are not required to be executed in the exact order. The control method 900 is summarized as follows.

Operation 901: a switch, coupled to a second side of the transformer, is activated at a first time point to induce an output current For example, the second switch SW2 is activated at the time point t1, and the output current IS is induced on the second side of the transformer 11.

Operation 902: the switch is deactivated at a second time point, at which the output current decreases to zero;

For example, the output current IS decreases to zero at the time point t2, and the second switch SW2 is deactivated accordingly.

Operation 903: the switch is activated at a third time point to induce the output current, wherein a flow of the output current at the third time point is opposite to a flow of the output current at the second time point For example, the second switch SW2 is activated at the time point t3, wherein the flow of the output current IS at the time point t3 is opposite to the flow of the output current IS at the time point t2.

Operation 904: the switch is deactivated at a fourth time point to induce an input current from the input terminal to an input voltage For example, the second switch SW2 is deactivated at the time point t4, and the input current IP is induced on the first side of the transformer 11. Specifically, the input current IP flows from the first capacitor C1 to the input voltage Vin via the input terminal IN.

Operation 905: another switch, which is coupled to a first side of the transformer, is activated at a fifth time point, at which a voltage on the input terminal decreases to zero.

For example, the voltage VP on the input terminal IN decreases to zero at the time point t5, and the first switch SW1 is activated.

Those skilled in the art should readily understand the detail of the control method 900 after reading the aforementioned embodiments. Therefore, the detailed description is omitted here for brevity.

Those of ordinary skill in the art may recognize that modifications of the embodiments disclosed herein are possible. For example, a total number of components in a flyback converter may vary. Other modifications may occur to those of ordinary skill in this art, and all such modifications are deemed to fall within the purview of the present invention, as defined by the claims.

The invention claimed is:

1. A flyback converter, comprising:
   a transformer, including a first side and a second side;
   a first switch and a second switch, wherein the first switch is coupled to the first side at an input terminal, and the second switch is coupled to the second side and an output terminal; and
   a control circuit, coupled between the output terminal and the second switch, wherein the control circuit is arranged to adjust a voltage on the input terminal by changing a flow of a current between the second switch and the second side;
   wherein the control circuit comprises:
   a trigger circuit, arranged to generate a trigger signal by comparing an output voltage on the output terminal to a reference voltage; and
   a first on-time control circuit, coupled to the trigger circuit, wherein the first on-time control circuit is arranged to generate a first activating signal to activate the second switch when the trigger signal indicates that the output voltage is smaller than the reference voltage.

2. The flyback converter of claim 1, wherein the first on-time control circuit is further arranged to deactivate the second switch by the first activating signal when the second switch is activated for a predetermined time period.

3. The flyback converter of claim 2, wherein the predetermined time period is inversely-related to a changing rate of the current between the second switch and the second side.

4. The flyback converter of claim 3, wherein the trigger circuit comprises:
   a comparing circuit, coupled to the output terminal, wherein the comparing circuit is arranged to generate an indication signal by comparing the output voltage to the reference voltage; and
   a pulse generating circuit, coupled to the comparing circuit, wherein the pulse generating circuit is arranged to generate the trigger signal when the indication signal indicates that the output voltage is smaller than the reference voltage.

5. The flyback converter of claim 4, further comprising:
   a first capacitor, connected in parallel with the first switch, wherein when the second switch is deactivated, an induction current flows to the input terminal from the first capacitor to decrease the voltage on the input terminal.

6. The flyback converter of claim 1, wherein the control circuit further comprises:
   a delay circuit, coupled to the trigger circuit, wherein the delay circuit arranged to generate a delay signal by delaying the trigger signal; and
   a second on-time control circuit, arranged to generate an on-time signal indicating an on-time of the first switch when the delay signal is received.

7. A flyback converter, comprising:
   a transformer, including a first side and a second side;
   a first switch and a second switch, wherein the first switch is coupled to the first side at an input terminal, and the second switch is coupled to the second side and an output terminal; and
   a control circuit, coupled between the output terminal and the second switch, wherein the control circuit is arranged to adjust a voltage on the input terminal by changing a flow of a current between the second switch and the second side;
   wherein the control circuit comprises:
   a trigger circuit, arranged to generate a trigger signal when a magnitude of the current between the second switch and the second side deceases to zero; and
   a first on-time control circuit, coupled to the trigger circuit, wherein the first on-time control circuit is arranged to generate a first activating signal for activating the second switch when the trigger signal is received to change the flow of the current between the second switch and the second side.

8. The flyback converter of claim 7, wherein the trigger circuit comprises:
   a current detecting circuit, arranged to generate an indication signal by detecting the magnitude of the current between the second switch and the second side; and
   a pulse generating circuit, coupled to the current detecting circuit, wherein the pulse generating circuit is arranged to generate the trigger signal when the indication signal indicates that magnitude of the current between the second switch and the second side decreases to zero.

9. The flyback converter of claim 8, wherein the current detecting circuit is further arranged to instruct the first on-time control circuit to deactivate the second switch according to the magnitude of the current between the second switch and the second side.

10. A flyback converter, comprising:
    a transformer, including a first side and a second side;
    a first switch, wherein the first switch and the first side are connected in series between an input voltage and a ground terminal;
    a second switch, wherein the second switch and the second side are connected in series between an output terminal and the ground terminal;
    a first control circuit, coupled to the output terminal and the second switch, wherein the first control circuit is arranged to compare an output voltage on the output terminal to a reference voltage, and activate the second switch at a first time point when the output voltage is smaller than the reference voltage, and further arranged to deactivate the second switch at a second time point; and
    a second control circuit, coupled to the first switch, wherein the second control circuit is arranged to activate the first switch at a third time point after the second switch is deactivated;
    wherein the first control circuit is further arranged to activate the second switch at a fourth time point after the first switch is activated;
    wherein a flow of a current between the second switch and the second side at the first time point is opposite to a flow of a current between the second switch and the second side at the fourth time point.

11. The flyback converter of claim 10, wherein a current between the second switch and the second side is zero when the first control circuit activates the second switch at the first time point.

12. The flyback converter of claim 10, wherein a voltage on a terminal between the first switch and the first side decreases to zero from the second time point to the third time point.

13. The flyback converter of claim 10, wherein the first control circuit comprises:
    a comparator, arranged to compare the output voltage to the reference voltage to generate an indication signal; and
    a pulse generating circuit, coupled to the comparator, wherein the pulse generating circuit is arranged to generate a pulse signal at the first time point when the indication signal indicates that the output voltage is smaller than the reference voltage.

14. The flyback converter of claim 13, wherein the first control circuit further comprises:
    a first on-time control circuit, coupled to the pulse generating circuit, wherein the first on-time control circuit is arranged to generate a first activating signal to activate the second switch when the pulse signal is received.

15. The flyback converter of claim 14, wherein the first control circuit further comprises:
    a delay circuit, coupled to the pulse generating circuit, wherein the delay circuit is arranged to generate a delay signal by delaying the pulse signal from the first time point to the third time point; and
    a second on-time control circuit, coupled to the delay circuit, wherein the second on-time control circuit is arranged to generate an on-time signal when the delay signal is received.

16. The flyback converter of claim 15, wherein the second control circuit comprises:
    an isolated transmission circuit, coupled to the second on-time control circuit, wherein the isolated transmission circuit is arranged to receive and transmit the on-time signal; and
    a receiver circuit, coupled to the isolated transmission circuit, wherein the receiver circuit is arranged to transmit a second activating signal for activating the first switch by identifying and decoupling an information included in the on-time signal when the on-time signal is received from the isolated transmission circuit.

17. A control method of a flyback converter, wherein the flyback converter comprises a transformer, a first switch coupled to a first side of the transformer at an input terminal, and a second switch coupled to a second side of the transformer; and wherein the control method comprises:
    activating the second switch at a first time point to induce an output current;
    deactivating the second switch at a second time point, at which the output current decreases to zero;
    activating the second switch at a third time point to induce the output current, wherein a flow of the output current at the third time point is opposite to a flow of the output current at the second time point;
    deactivating the second switch at a fourth time point to induce an input current from the input terminal to an input voltage; and
    activating the first switch at a fifth time point, at which a voltage on the input terminal decreases to zero.

* * * * *